(12) United States Patent
Chang

(10) Patent No.: US 6,719,155 B1
(45) Date of Patent: Apr. 13, 2004

(54) MAGNETIC TOOL RACK

(76) Inventor: Ching-Tsung Chang, No. 151 1, Fwu Tay St., U Ryh Hsiang, Taichung Hsien (TW)

( * ) Notice: Subject to any disclaimer, the term of this patent is extended or adjusted under 35 U.S.C. 154(b) by 0 days.

(21) Appl. No.: 10/301,752

(22) Filed: Nov. 22, 2002

(51) Int. Cl.$^7$ .............................. A47G 1/17; A47F 7/00
(52) U.S. Cl. .............. 211/70.6; 211/DIG. 1; 248/309.4; 248/206.5; 206/350
(58) Field of Search ................. 211/70.6, DIG. 1; 248/309.4, 206.5; 206/350, 818; 451/494

(56) References Cited

U.S. PATENT DOCUMENTS

| | | | | |
|---|---|---|---|---|
| 2,966,992 A | * | 1/1961 | Dunkelberger et al. | 211/DIG. 1 |
| 3,827,021 A | * | 7/1974 | Phelon | 248/309.4 |
| 4,544,067 A | * | 10/1985 | Miller | 211/70.6 |
| 4,682,698 A | * | 7/1987 | Handler et al. | 211/70.6 |
| 4,899,894 A | * | 2/1990 | Crump | 211/DIG. 1 |
| 5,301,822 A | * | 4/1994 | Coleman et al. | 211/70.6 |
| 5,669,516 A | * | 9/1997 | Horn | 211/70.6 |
| 5,760,668 A | * | 6/1998 | Testa et al. | 211/DIG. 1 |
| 6,626,303 B1 | * | 9/2003 | Moodie | 211/70.7 |

* cited by examiner

*Primary Examiner*—Daniel P. Stodola
*Assistant Examiner*—Erica B Harris
(74) *Attorney, Agent, or Firm*—Troxell Law Office PLLC

(57) ABSTRACT

A magnetic tool rack includes a magnet container that is internally divided into several compartments for separately holding small-size intense magnets therein and has two covers attached to upper and lower sides thereof, giving the whole rack an integral appearance. The magnetic tool rack may be mounted to a wall via brackets fixed to the magnet container at predetermined positions for magnetically holding different hand tools. The magnet container is made of a plastic material through integral injection molding to show one or more colors, and designs and patterns may be printed on a front side of the magnet container to create changes in the appearance of the rack.

6 Claims, 6 Drawing Sheets

MAGNETIC TOOL RACK

BACKGROUND OF THE INVENTION

The present invention relates to a magnetic tool rack, and more particularly to a magnetic tool rack having an integral and pleasant appearance showing different colors and patterns.

FIGS. 1 and 2 show two types of currently available magnetic tool racks. The magnetic tool rack shown in FIG. 1 was developed in an early stage and mainly includes a long bar of intense magnet 5 having two covers 1, 2 attached to upper and lower surfaces thereof. Brackets 3, 4 are fixed to the upper cover 1 for mounting the magnetic tool rack to a wall. The long bar of intense magnet 5 is expensive and has only one monotonous color. The monotonous magnet 5 is visible from outside of the magnetic tool rack, giving the latter an unpleasant appearance. The magnetic tool rack shown in FIG. 2 was developed in an attempt to improve the magnetic tool rack of FIG. 1 and mainly includes a plurality of small-size intense magnets 5 bound with a tape 6 to form a large piece of magnet. The small-size intense magnet 5 is less expensive as compared with the long bar of magnet, and the tape 6 binding the small-size magnets 5 enables the magnetic tool rack to has a somewhat integral appearance. However, the magnetic tool rack of FIG. 2 requires longer time to assemble and could not be manufactured in mass production, and actually requires an increased overall manufacturing cost as compared with the magnetic tool rack of FIG. 1. It is therefore tried by the inventor to develop an improved magnetic tool rack to eliminate the drawbacks existing in the conventional magnetic tool racks.

SUMMARY OF THE INVENTION

A primary object of the present invention is to provide a magnetic tool rack that uses small-size intense magnets to reduce the manufacturing cost of the rack.

Another object of the present invention is to provide a magnetic tool rack that includes a magnet container to receive small-size magnets therein and thereby has an integral and pleasant appearance.

A further object of the present invention is to provide a magnetic tool rack having a magnet container showing different colors and having designs and patterns provided on a front side thereof to create changes in the appearance of the magnetic tool rack.

A still object of the present invention is to provide a magnetic tool rack that could be produced in mass production to reduce the manufacturing cost thereof.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
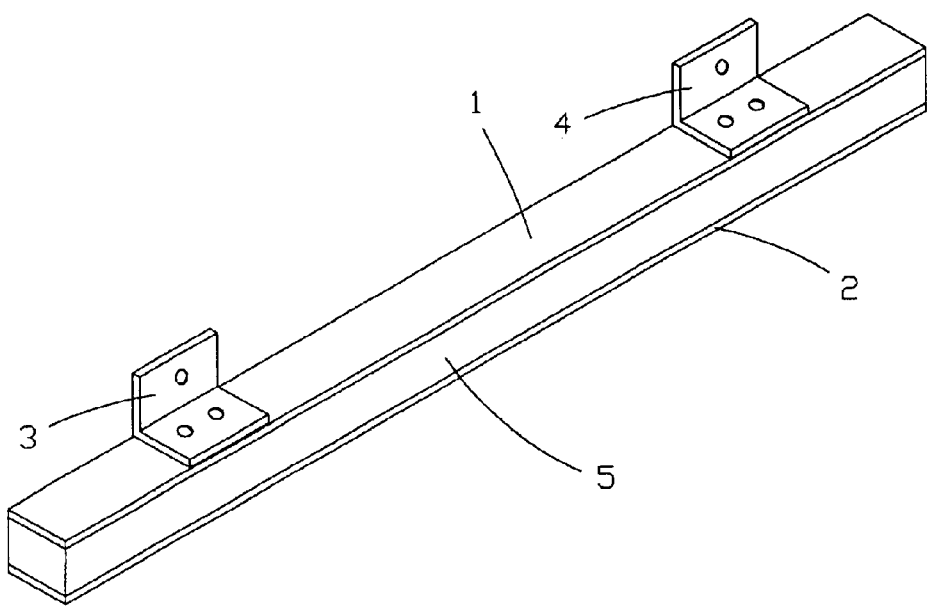
FIG. 1 is a perspective view of a first conventional magnetic tool rack.
Figure 2:
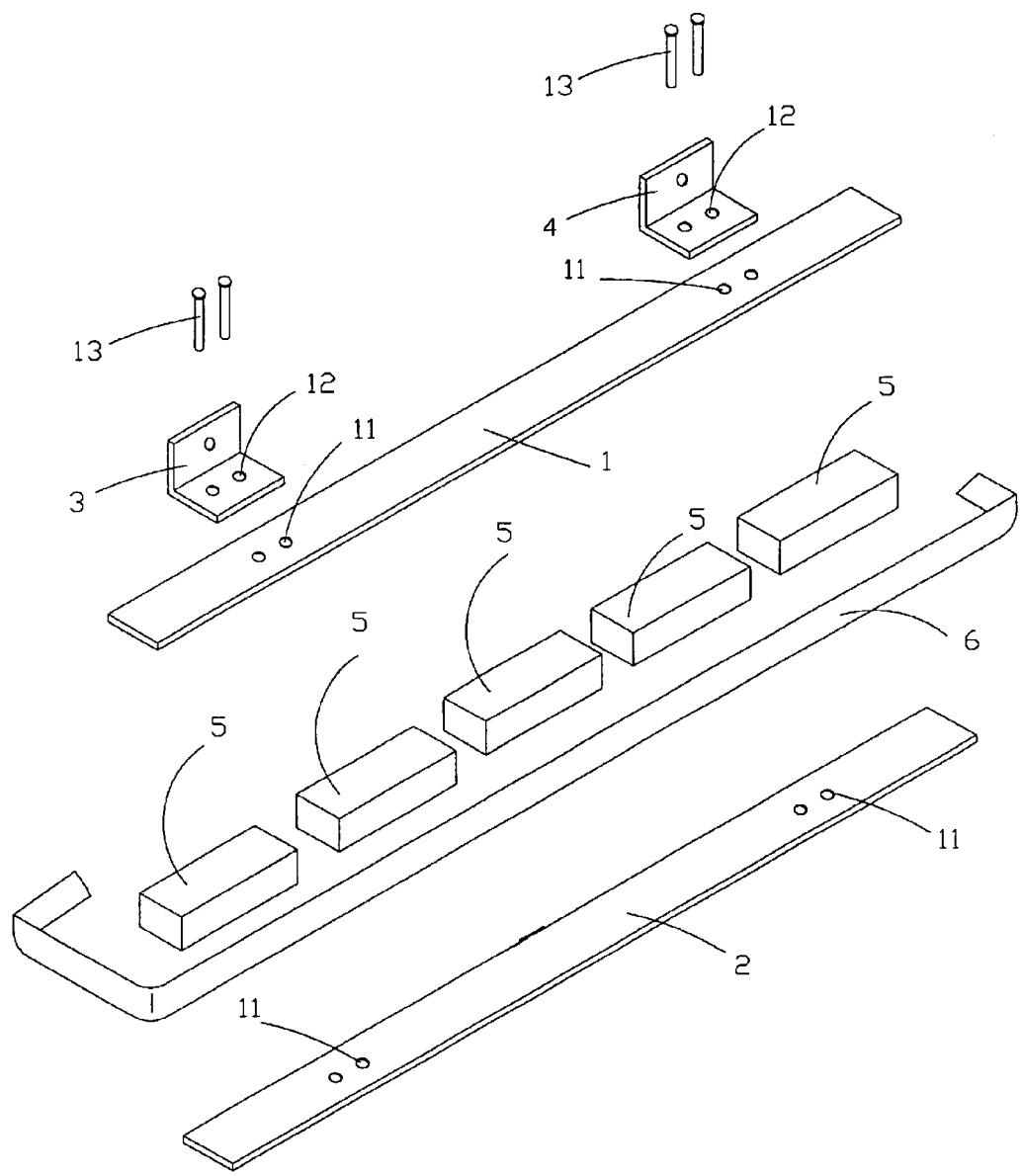
FIG. 2 is an exploded perspective view of a second conventional magnetic tool rack.
Figure 3:
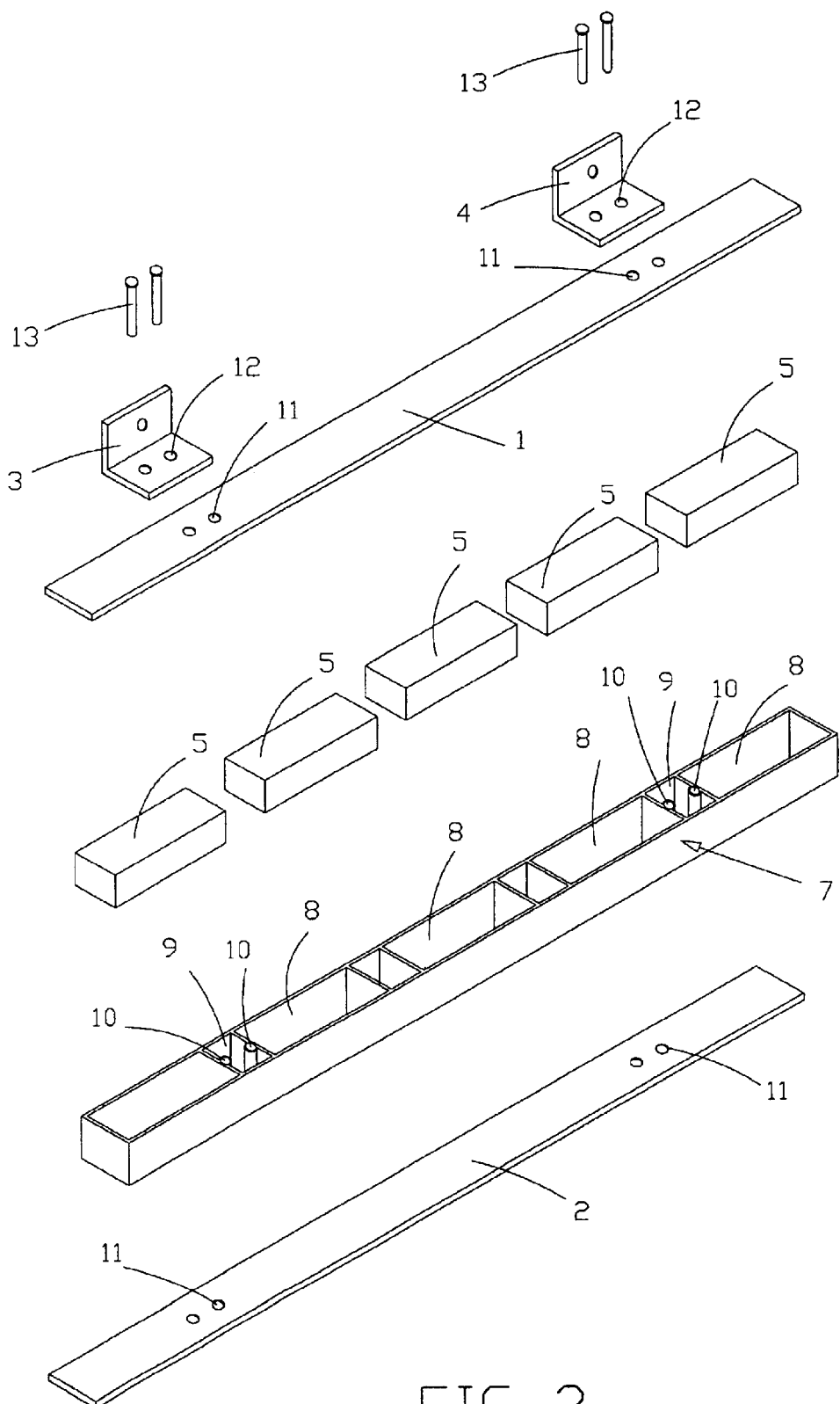
FIG. 3 is an exploded perspective view of a magnetic tool rack according to the present invention.

Please refer to FIG. 3 that is an exploded perspective view of a magnetic tool rack of the present invention. As shown, the magnetic tool rack mainly includes an upper cover 1, a lower cover 2, brackets 3, 4, a plurality of small-size intense magnets 5, and a magnet container 7.

The magnet container 7 is made of a plastic material through integral injection molding to have five closed wall portions and an open top. An inner space of the magnet container 7 is divided into a plurality of spaced magnet compartments 8 corresponding to the intense magnets 5 in number and in shape, and a plurality of mounting compartments a appearing at predetermined intervals. There are vertically extended mounting sleeves 10 provided in each mounting compartment 9 at predetermined positions. The magnet container 7 may be injection-molded to show one or more desired colors, such as red, yellow, blue, etc. It is also possible to print various kinds of designs or patterns on a front wall portion of the magnet container 7 to create changes in the appearance of the magnet container 7. The upper and the lower cover 1, 2 are provided with mounting holes 11 at positions and in size corresponding to those of the mounting sleeves 10 in the mounting compartments 9 of the magnet container 7. The brackets 3, 4 are also provided with mounting holes 12 at positions and in size corresponding to those of the mounting sleeves 10.

Figure 4:
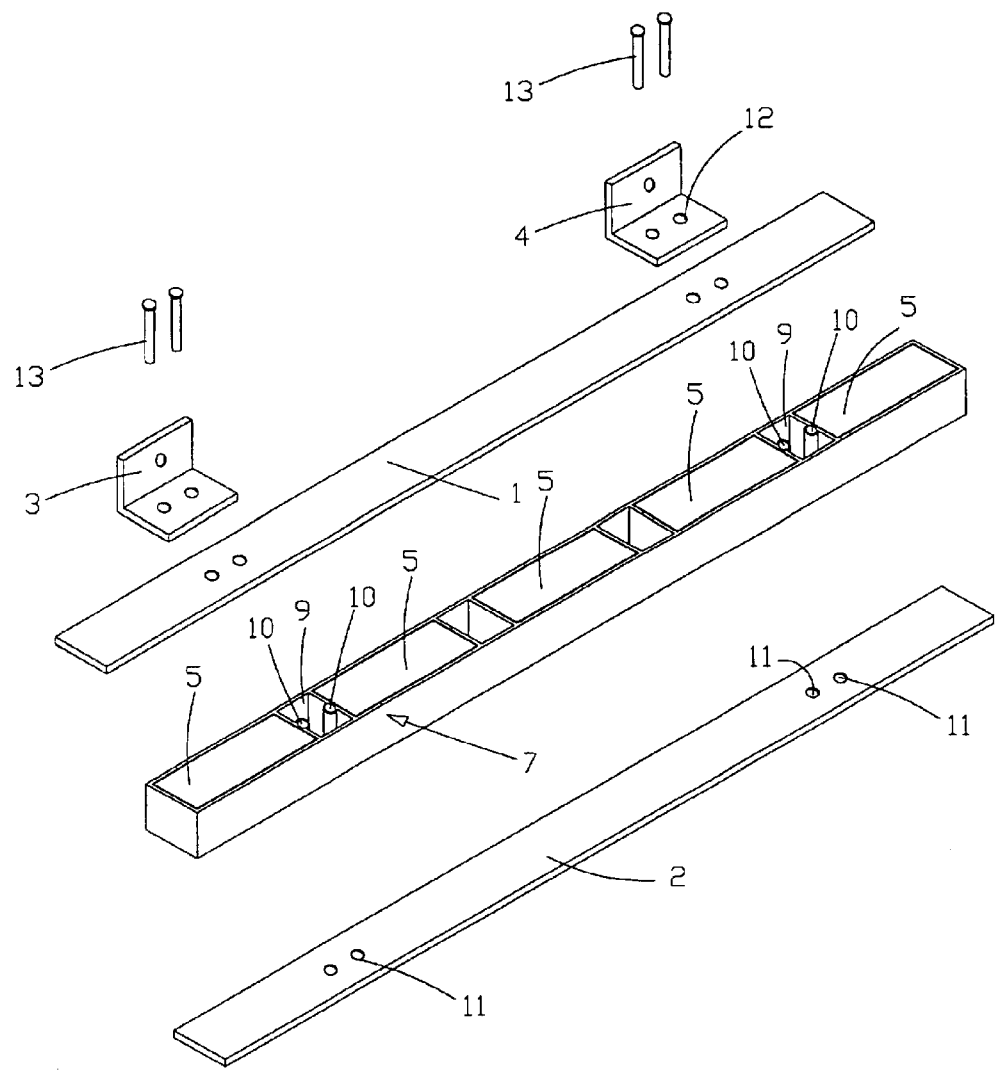
FIG. 4 is a partially assembled perspective view of FIG. 3.
Figure 5:
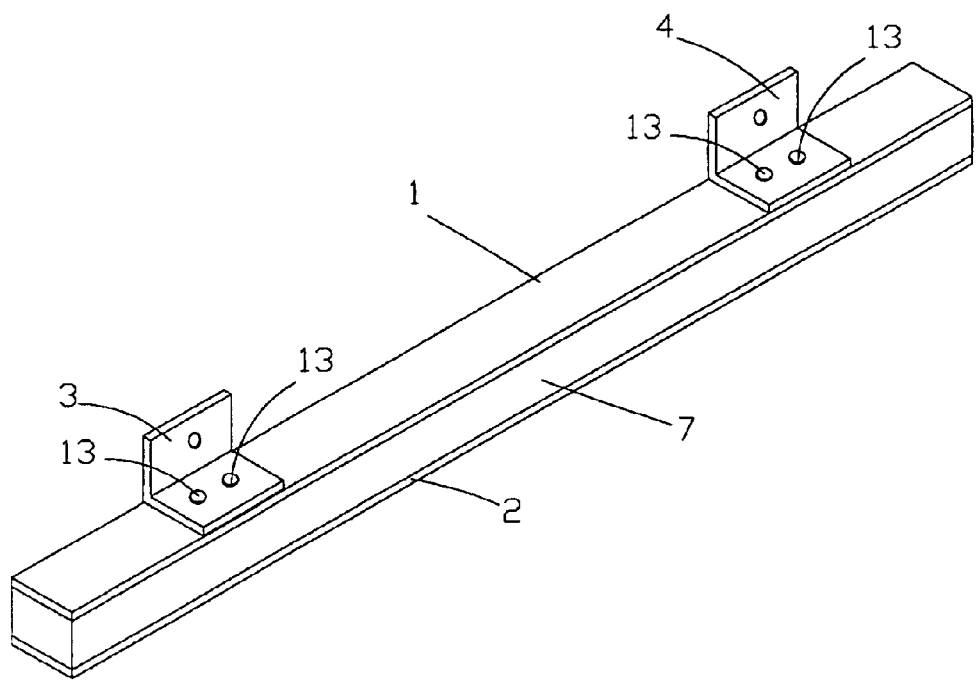
FIG. 5 is a fully assembled perspective view of FIG. 3.
Figure 6:
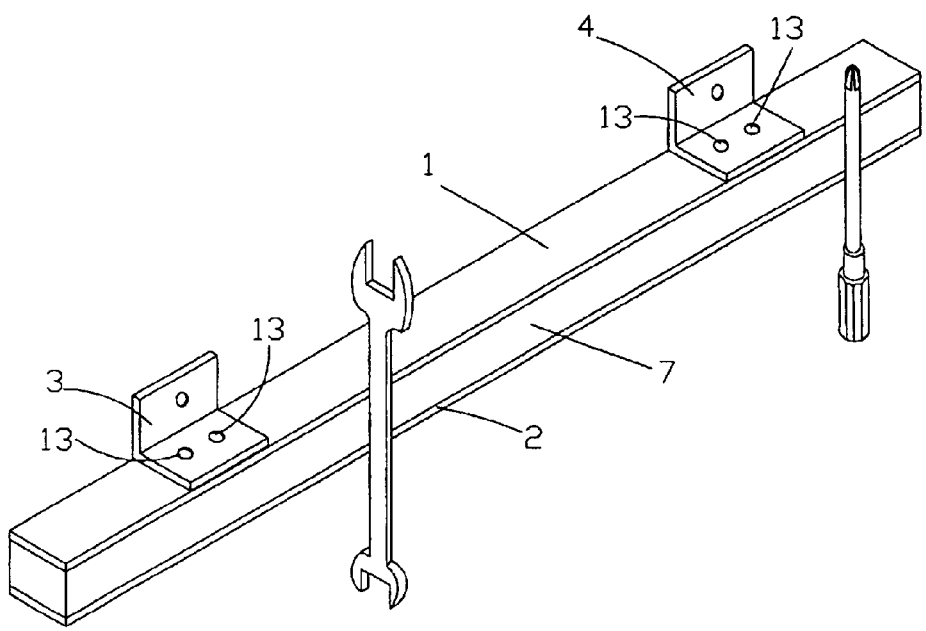
FIG. 6 shows the use of the magnetic tool rack of the present invention to magnetically hold different hand tools.

Please refer to FIGS. 4 and 5. To assemble the magnetic tool rack of the present invention, first separately put the small-size intense magnets 5 into the magnet compartments 8 of the magnet container 7, attach the upper and the lower cover 1, 2 to upper and lower sides of the magnet container 7 with the mounting holes 11 aligned with the mounting sleeves 10, and fix the brackets 3, 4 to the upper cover 1 by extending fastening means, such as rivets 13, through the mounting holes 12 on the brackets 3, 4 and the mounting holes 11 on the upper cover 1 into the mounting sleeves 10 on the magnet container 7. A fully assembled magnetic tool rack is shown in FIG. 5. The completed magnetic tool rack may be mounted to a wall at a desired location via the brackets 3, 4 to magnetically hold different hand tools, as shown in FIG. 6. The colored and/or patterned front wall portion of the magnet container 7 makes the entire magnetic tool rack more attractive in appearance.

What is claimed is:

1. A magnetic tool rack, comprising:
   a magnet container made of a plastic material through integral injection molding, and internally provided at predetermined positions with mounting sleeves;
   a plurality of small-size intense magnets positioned in said magnet container;
   upper and lower covers respectively attached to upper and lower sides of said magnet container and provided at predetermined positions with mounting holes corresponding to said mounting sleeves in said magnet container; and
   brackets provided at predetermined positions with mounting holes corresponding to said mounting sleeves in said magnet container for fixing to said upper cover to connect said magnetic tool rack to a wall.

2. The magnetic tool rack as claimed in claim 1, wherein said magnet container includes five closed wall portions with an open top.

3. The magnetic tool rack as claimed in claim 2, wherein said magnet container is internally divided into a plurality of spaced magnet compartments corresponding to said small-size intense magnets in number and in shape.

4. The magnetic tool rack as claimed in claim 3, wherein said magnet container is internally provided with a plurality of mounting compartments at predetermined intervals, and said mounting sleeves being provided in each of said mounting compartments at predetermined positions.

5. The magnetic tool rack as claimed in claim 4, wherein said magnet container is integrally injection-molded into one or more colors.

6. The magnetic tool rack as claimed in claim 5, wherein said magnet container is printed on a front wall portion with different designs or patterns.

* * * * *